United States Patent
Morton et al.

(10) Patent No.: US 10,421,017 B2
(45) Date of Patent: Sep. 24, 2019

(54) BALANCING MULTIPLE TEAM BASED GAMES

(71) Applicant: SONY INTERACTIVE ENTERTAINMENT AMERICA LLC, San Mateo, CA (US)

(72) Inventors: Anthony William Morton, San Diego, CA (US); Jason Allen Stone, Oceanside, CA (US); Shannon Ray Michael, San Marcos, CA (US); Jose Roberto Green, San Diego, CA (US); Blaine Edward Smith, La Jolla, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 963 days.

(21) Appl. No.: 14/960,091

(22) Filed: Dec. 4, 2015

(65) Prior Publication Data
US 2017/0157518 A1   Jun. 8, 2017

(51) Int. Cl.
| | |
|---|---|
| A63F 13/58 | (2014.01) |
| A63F 13/70 | (2014.01) |
| A63F 13/55 | (2014.01) |
| A63F 13/79 | (2014.01) |
| A63F 13/31 | (2014.01) |

(52) U.S. Cl.
CPC .............. *A63F 13/70* (2014.09); *A63F 13/31* (2014.09); *A63F 13/55* (2014.09); *A63F 13/58* (2014.09); *A63F 13/79* (2014.09); *A63F 2300/558* (2013.01); *A63F 2300/5566* (2013.01)

(58) Field of Classification Search
CPC .......... A63F 13/55; A63F 13/58; A63F 13/79; A63F 2300/5553; A63F 2300/5566; A63F 2300/558
See application file for complete search history.

(56) References Cited

U.S. PATENT DOCUMENTS

| | | | | |
|---|---|---|---|---|
| 2003/0092492 | A1* | 5/2003 | Ishii | A63F 13/12 462/42 |
| 2004/0242294 | A1* | 12/2004 | Shiozawa | A63F 13/10 463/9 |
| 2013/0310181 | A1 | 11/2013 | Kislyi et al. | |
| 2014/0302924 | A1 | 10/2014 | Lam | |
| 2015/0094135 | A1 | 4/2015 | Hedrick et al. | |
| 2016/0206961 | A1* | 7/2016 | Taylor | A63F 13/795 |

OTHER PUBLICATIONS

International Search Report and Written Opinion of the International Searching Authority/United States for International Patent Application No. PCT/US2016/060655 dated Jan. 31, 2017.

* cited by examiner

*Primary Examiner* — Steven J Hylinski
(74) *Attorney, Agent, or Firm* — Procopio, Cory, Hargreaves & Savitch LLP

(57) ABSTRACT

Dynamically balancing imbalanced teams in a multiple team game, including: generating at least three teams, each team comprising members belonging to a first type or a second type; applying a first growth pattern to members of the first type and a second growth pattern to members of the second type, converting at least one member of the first type to the second type; and adjusting the first and second growth patterns based on the conversion of the at least one member.

20 Claims, 5 Drawing Sheets

BALANCING MULTIPLE TEAM BASED GAMES

BACKGROUND

Field of the Invention

The present application relates to multiple team based games, and more specifically, to balancing imbalanced multiple team based games.

Background

Team games often involve multiple teams and multiple players in each team. Each team may be pitted against one another. Imbalanced teams due to skill or the number of players on each team can result in lopsided team games. Imbalanced teams may be dynamically adjusted during the game to achieve optimal balance and enjoyment of the game.

SUMMARY

Implementations of the present application provide for the balancing of imbalanced teams in a multiple team based game.

In one implementation, provided is a method for dynamically balancing imbalanced teams in a multiple team game, the method including: generating at least three teams including a first team, a second team, and a third team, each team comprising members belonging to a first type or a second type; applying a first growth pattern to members of the first type and a second growth pattern to members of the second type, wherein the first and second growth patterns are each a function of a ratio of a first number of members of the first type to a second number of members of the second type; converting at least one member of the first type to the second type; and adjusting the first and second growth patterns based on the conversion of the at least one member.

In another implementation, provided is a non-transitory computer-readable storage medium storing a computer program to balance imbalanced teams in a multiple team game, the computer program including executable instructions that cause a computer to: generate at least three teams including a first team, a second team, and a third team, each team comprising members belonging to a first type or a second type; apply a first growth pattern to members of the first type and a second growth pattern to members of the second type, wherein the first and second growth patterns are each a function of a ratio of a first number of members of the first type to a second number of members of the second type; convert at least one member of the first type to the second type; and adjust the first and second growth patterns based on the conversion of the at least one member.

In yet another implementation, provided is a host computing device for balancing imbalanced teams in a multiple team game, the host computing device including: a team generator configured to generate at least three teams including a first team, a second team, and a third team, each team comprising members belonging to a first type or a second type; a growth pattern manager configured to apply a first growth pattern to members of the first type and a second growth pattern to members of the second type, wherein the first and second growth patterns are each a function of a ratio of a first number of members of the first type to a second number of members of the second type; convert at least one member of the first type to the second; and adjust the first and second growth patterns based on the conversion of the at least one member.

Other features and advantages of the present application will become more readily apparent to those of ordinary skill in the art after reviewing the following detailed description and accompanying drawings.

DETAILED DESCRIPTION

Certain implementations as disclosed herein provide for multiple team based games. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

Figure 1A:
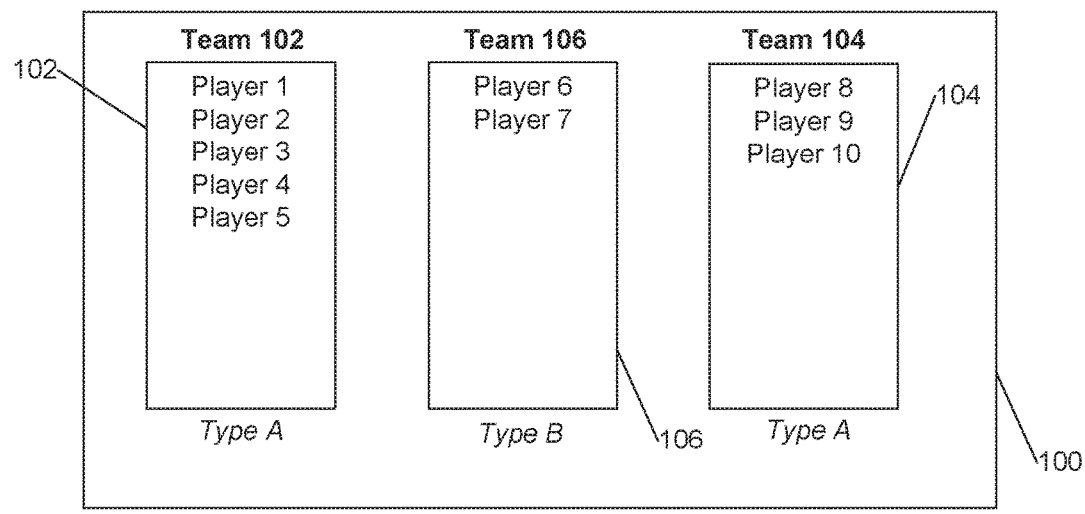
FIG. 1A depicts a diagram of a plurality of teams and a plurality of players of a multiple team based game in accordance with an implementation of the present application.

FIG. 1A depicts a diagram of a plurality of teams and a plurality of players of a multiple team based game in accordance with an implementation of the present application. For example, a multiple team based game 100 may include a team 102, a team 104, and a team 106. Each team may include at least one player. As illustrated, team 102 may include five players (Players 1-5), team 104 may include three players (Players 8-10), and team 106 may include two players (Players 6 and 7). This illustrates that the teams can be imbalanced in terms of the number of players on each team. In some embodiments, two of the teams may include the same number of players. In some embodiments, there are more than three teams and each team may contain a different amount of players.

Each team may belong to a certain type. For example, team 102 and team 104 may belong to first type, such as a Type A, and team 106 may belong to a second type, such as a Type B. In some embodiments, Type A and Type B are different races, such as humans and mutants. In other embodiments, Type A and Type B are different species, classes, groups, or other types of categories. In embodiments where there are more than three teams, each type is represented at least once amongst all the teams. For instance, in a game with five teams, there may be four teams belonging to Type A, and one team belonging to Type B.

The team size of each team may dynamically change during the game. In some instances, one player from a team may switch to another team. This may be referred to as dynamic team switching. In other instances, one player may be eliminated from a team and is out of the game. Dynamic team switching may arise due to team members of one team actively converting team members of an opposing team to their own team. Dynamic team switching may cause additional imbalances in the game which may be dynamically adjusted during the game. Dynamic adjustments will be further discussed below.

Figure 1B:
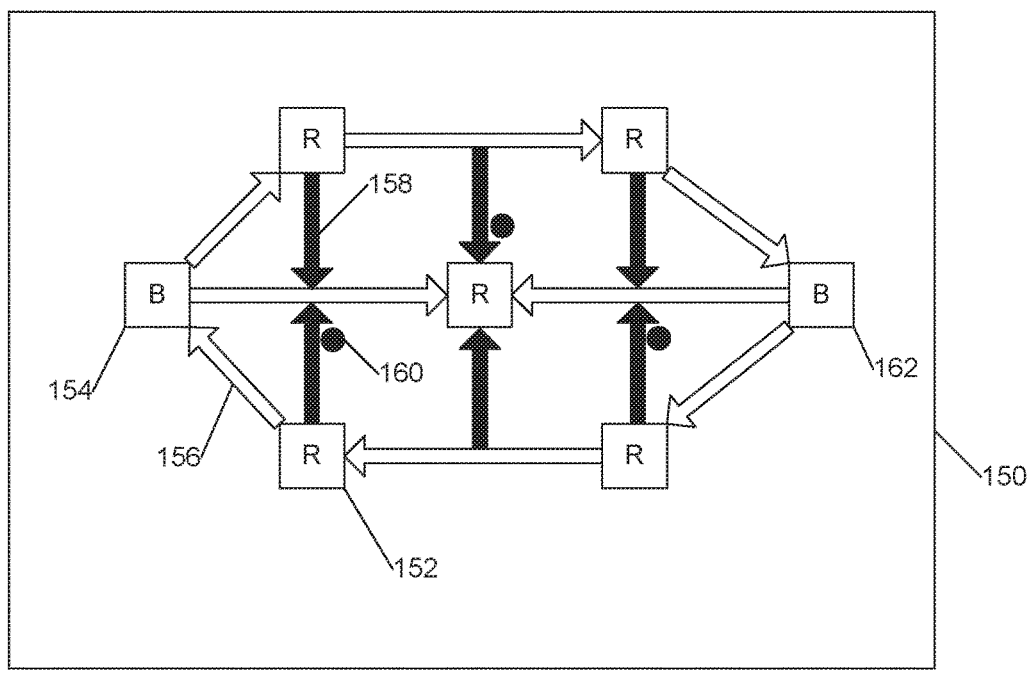
FIG. 1B depicts a map environment of a multiple team based game in accordance with an implementation of the present application.

FIG. 1B depicts a map environment 150 of a multiple team based game in accordance with an implementation of the present application. Map environment 150 may be implemented for a team based game having two different types of races. Map environment 150 may include specific elements designed for a specific type of team. In addition, map environment 150 may include specific elements designed for at least three teams. For example, a plurality of pathways 158 (indicated by black arrows) may yield benefits to Type B players when traversed by Type B players, and/or may yield penalties to Type A players when traversed by Type A players. When traversed by Type B players, Type B players may receive health benefits, increases in power, increases in speed, or other benefits. When traversed by Type A players, Type A players may receive penalties such as damage to health, reduced power, reduced speed, or other related penalties. A plurality of pathways 156 (indicated by white arrows) may be neutral to traverse by all players regardless of type. In some embodiments, pathways 156 may yield penalties to Type B players such as revealing the Type B players location. In some embodiments, pathways 156 may provide safe pathways for Type A players to traverse between resource points and bases.

In some embodiments, at least one of the pathways 158 may feature a growth pod 160 (indicated by black circles) adjacent to it. A growth pod 160 may extend an adjacent pathway 158. Each growth pod 160 may extend an adjacent pathway 158 outwards into one of the pathways 156. In this instance, pathway 156 may be converted to a pathway 158. In some embodiments, it is beneficial to the opposing team, in this instance Team A, to eliminate growth pods 160.

Map environment 150 may also include a plurality of bases (indicated by "B" boxes) and a plurality of resource points (indicated by "R" boxes). For example, map environment 150 may include a first base 154, a second base 162, and a plurality of resource points 152. Each base may belong to a team. In some embodiments, each base belongs to a Type A team. For example, first base 154 may belong to team 102 of FIG. 1 and second base 162 may belong to team 104 of FIG. 1. In some embodiments, teams have an objective to destroy an opposing team's base. Team 102 may have an objective to destroy team 104's base 162, and team 104 may have an objective to destroy team 102's base 154. In some embodiments, team 106 of FIG. 1 may have an objective to destroy either first base 154 or second base 162. Each resource point 152 may be a location to collect resources. Resources may include health boxes, weapons, ammunition, and other similar items. In some embodiments, each resource point 152 may include a team specific ability retrieval location.

Figure 2A:
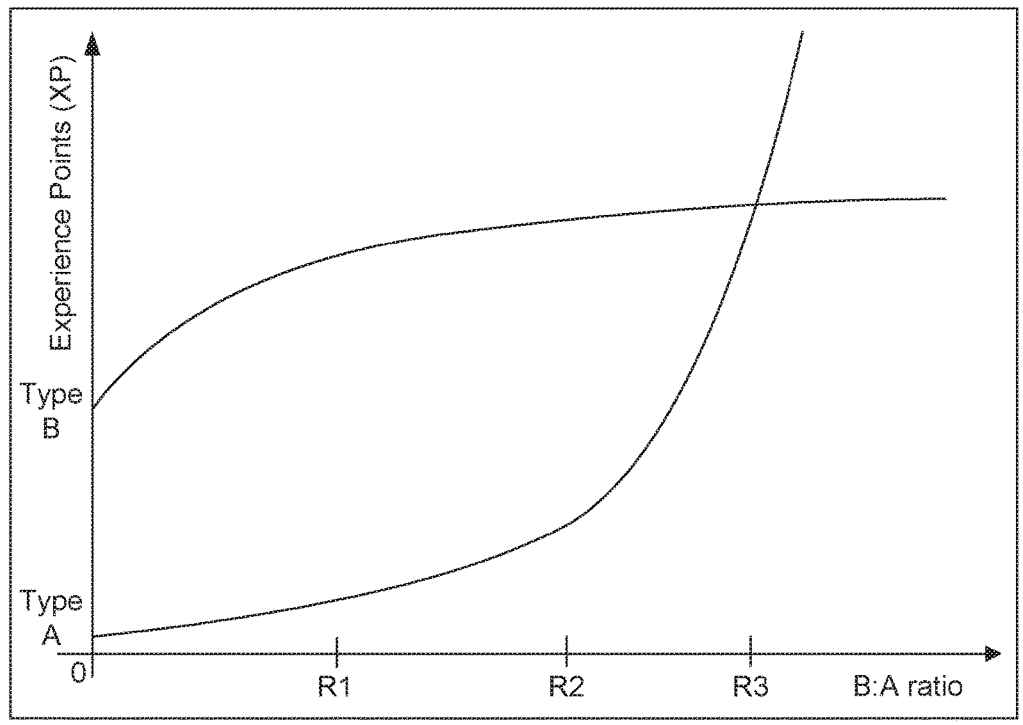
FIG. 2A depicts a chart illustrating a function of a balancing system in accordance with an implementation of the present application.

FIG. 2A depicts a chart illustrating a function of a balancing system in accordance with an implementation of the present application. The chart illustrates different experience points ("XP") growth curves for Type A players and Type B players. The XP growth curves are plotted against the ratio of Type B to Type A players. XP growth may be tied to the strength of a player. For instance, XP may be collected over the course of a game to level up a player. In general, a player becomes stronger as he levels up through the game.

During a first phase of B:A ratios from 0 to R1 of a game, Type A's XP growth may increase incrementally. In some embodiments, R1 may represent a small Type B to Type A ratio. For instance, the first phase may be about 1:4. Type A's XP growth may have a low multiplier throughout the first phase. In embodiments where there are more Type A players than Type B players, the incremental XP growth curve for Type A players may limit the strength of Type A players in comparison to Type B players. This may compensate for the relatively small number of Type B players. On the other hand, during the first phase of the game, Type B's XP growth may be rapid. Type B's XP growth multiplier may start at a higher number than Type A and may increase to a moderate number. This may allow Type B players to become stronger more quickly due to the relative lack of Type B players compared to Type A players.

During a second phase of B:A ratios from R1 to R2, Type A's XP growth may increase by a near linear correlation. In some embodiments, R2 may represent a medium Type B to Type A ratio. For instance, R2 may be about 1:2. As such, the second phase may span between a 1:4 ratio to a 1:2 ratio. Type A's XP growth multiplier may increase from a low number to a moderate number throughout the second phase. This may allow Type A players to grow XP more quickly and thus level up more quickly. During the second phase, Type B's XP growth may decrease to an incremental amount. By the end of the second phase, Type B's XP growth multiplier may only increase by a small amount and remain at a slightly higher moderate number. This may slow down the original rapid XP growth of Type B players during the first phase.

During a third phase of B:A ratios from R2 to R3, Type A's XP growth may increase exponentially. In some embodiments, R3 represents a large Type B to Type A ratio. For instance, R3 may be about 2:1. As such, the third phase may span between a 1:2 ratio to a 2:1 ratio. Type A's XP growth multiplier may increase from a medium number to a high number throughout the third phase. This may allow for Type A players to rapidly increase in strength when there is a relatively small number of Type A players compared to Type B players. During the third phase, Type B's XP growth may decrease to a near plateau. Type B's XP growth multiplier may stagnate at a slightly higher than moderate number. This may limit the strength of Type B players during the latter parts of the game. This trend during the third phase may continue after R3.

As shown, the XP growth of Type A may be the inversion of the XP growth of Type B. In some embodiments, the different XP growth curves may correlate to a game in which Type A players may be converted to Type B players, thus increasing the pool of Type B players.

Figure 2B:
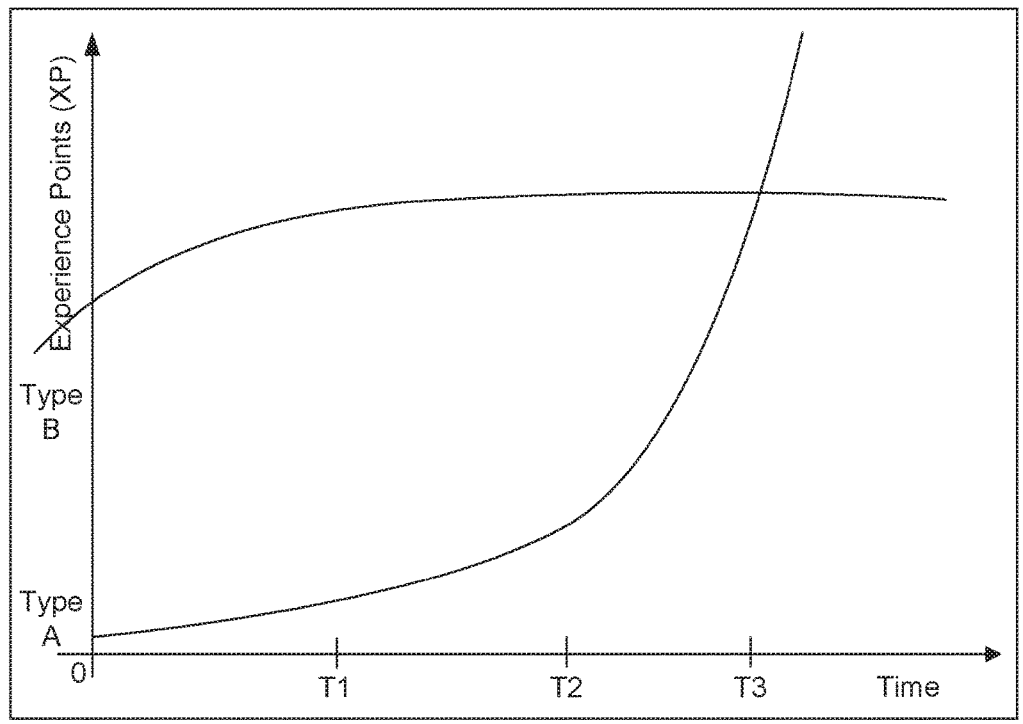
FIG. 2B depicts a chart illustrating a function of another balancing system in accordance with an implementation of the present application.

FIG. 2B depicts a chart illustrating a function of another balancing system in accordance with an implementation of the present application. The chart illustrates different experience points ("XP") growth curves for Type A players and Type B players. The XP growth curves are plotted over time.

XP growth may be tied to the strength of a player. For instance, XP may be collected over the course of a game to level up a player. In general, a player becomes stronger as he levels up through the game.

During a starting period from 0 to T1 of a game, Type A's XP growth increase incrementally. Type A's XP growth may have a very low multiplier throughout the starting period. In embodiments where there are more Type A players than Type B players, the initial incremental XP growth curve for Type A players may limit the strength of Type A players in comparison to Type B players. This may compensate for the decreased number of Type B players. On the other hand, during the initial starting period of the game, Type B's XP growth may be rapid. Type B's XP growth multiplier may start at a higher number than Type A and may increase to a moderate number. This may allow Type B players to become stronger more quickly due to the relative lack of Type B players compared to Type A players.

During an intermediate period from T1 to T2, Type A's XP growth may increase by a near linear correlation. Type A's XP growth multiplier may increase from a low number to a moderate number. This may allow Type A players to grow XP more quickly and thus level up more quickly. In some embodiments, Type A's XP growth increase may be due to the decreasing amount of Type A players throughout the course of the game. During the intermediate period, Type B's XP growth may decrease to an incremental amount. By the end of the intermediate period, Type B's XP growth multiplier may only increase by a small amount and remain at a slightly higher moderate number. This may slow down the original rapid XP growth of Type B players during the starting period. In some embodiments, Type B's XP growth decrease may be due to the increasing amount of Type B players throughout the course of the game.

During a late period from T2 to T3, Type A's XP growth may increase exponentially. Type A's XP growth multiplier may increase to a very high number. This may allow for Type A players to rapidly increase in strength during the latter parts of the game. In some embodiments, this may be due to the low number of Type A players compared to Type B players. During the late period, Type B's XP growth may decrease to a near plateau. Type B's XP growth multiplier may stagnate at the slightly higher moderate number. This may limit the strength of Type B players during the latter parts of the game. In some embodiments, Type B's XP growth stagnation may be due to the increasing amount of Type B players throughout the course of the game.

As shown, the XP growth of Type A may be the inversion of the XP growth of Type B. In some embodiments, the different XP growth curves may correlate to a game in which Type A players may switch to Type B players, thus increasing the pool of Type B players.

Figure 3A:
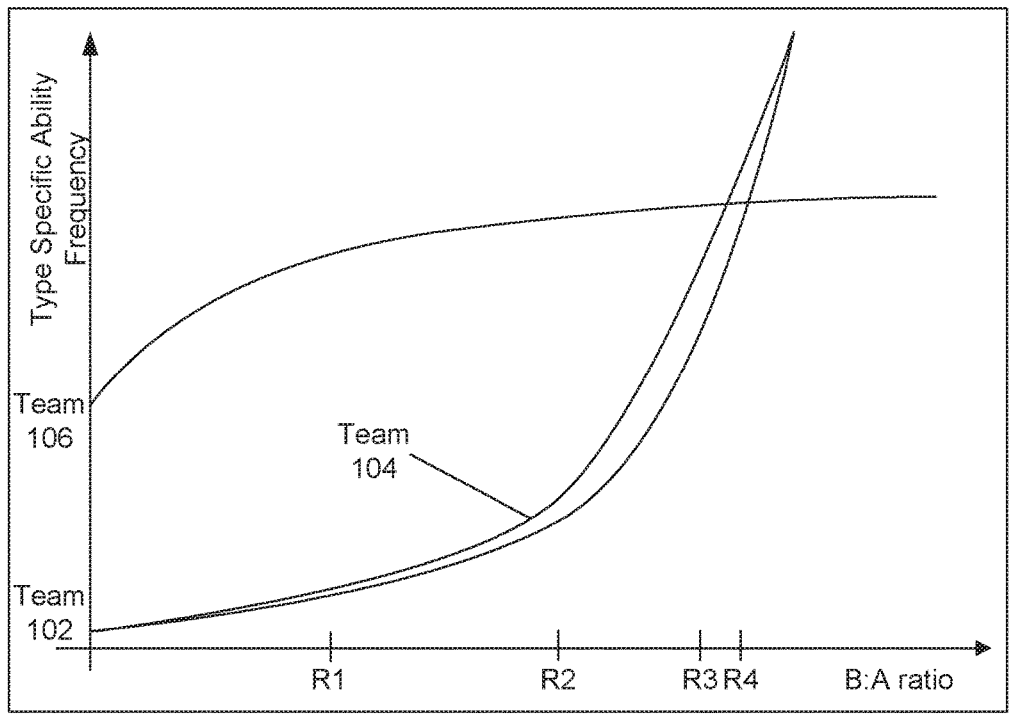
FIG. 3A depicts a chart illustrating a function of another balancing system in accordance with an implementation of the present application.

FIG. 3A depicts a chart illustrating a function of another balancing system in accordance with an implementation of the present application. The chart illustrates different team specific ability ("TSA") frequency multiplier patterns for Team 102, Team 104, and Team 106 (of FIG. 1). Team 102 may be composed of Type A players, Team 104 may be composed of Type A players, and Team 106 may be composed of Type B players. A team specific ability may be obtained by a player during the course of a game. Further, a team specific ability may be a special ability designated for each team. Team specific abilities may increase a player's strength, speed, stamina, or other similar attributes. Furthermore, a team specific ability may provide a boost to a team when the circumstances of the game disfavor the team. For example, a team specific ability may aid in rapidly destroying opponents and/or opponents' bases. For another example, a team specific ability may aid in rapidly converting players from one team to another. In general, the more frequent the team specific ability is obtained, the stronger the player will become. The frequency of the team specific ability may depend on the ratio of Type B players to Type A players. In some embodiments, the frequency of the team specific ability may depend on the ratio of the team size of other teams compared to one's own team. The TSA frequency multiplier patterns are plotted against the ratio of Type B to Type A players.

During a first phase of B:A ratios from 0 to R1 of a game, Team 102's TSA frequency may increase incrementally. In some embodiments, R1 may represent a small Type B to Type A ratio. For instance, the first phase may be about 1:4. Team 102's TSA frequency may have a low multiplier throughout the first phase. In embodiments where a game begins with more Type A players than Type B players, the incremental TSA frequency increase may limit the amount of TSA's obtained by Team 102's players during the first phase. This may compensate for the relatively small number of Type B players.

Similar to Team 102, Team 104's TSA frequency may also increase incrementally during the first phase. In instances where Team 104 includes fewer players than Team 102, Team 104's TSA frequency may increase at a slightly faster rate than Team 102 throughout the first phase. On the other hand, Team 106's TSA frequency may increase rapidly during the first phase. Team 106's TSA frequency multiplier may start at a higher number than Team 102 and Team 104 and may increase to a moderate number at the end of the first phase. This may allow Team 106 players to become stronger more quickly due to the relative lack of Type B players compared to Type A players.

During a second phase of B:A ratios from R1 to R2, Team 102's TSA frequency may increase by a near linear correlation. In some embodiments, R2 may represent a medium Type B to Type A ratio. For instance, R2 may be about 1:2. As such, the second phase may span between a 1:4 ratio to a 1:2 ratio. Team 102's TSA frequency multiplier may increase from a low number to a moderate number throughout the second phase. This may provide a way for Team 102 to maintain strength when Type A players are increasingly converted to Type B players.

Similarly, Team 104's TSA frequency may increase by a near linear correlation. In instances where Team 104 includes fewer players than Team 102, Team 104's TSA frequency may increase at a slightly faster rate than Team 102 throughout the second phase. On the other hand, Team 106's TSA frequency multiplier may increase incrementally. By the end of the second phase, Team 106's frequency multiplier may only increase by a small amount and remain at a slightly higher moderate number. This may slow down the original rapid TSA frequency growth of Team 106 players during the first phase.

During a third phase of B:A ratios from R2 to R3, Team 102's TSA frequency may increase exponentially. In some embodiments, R3 represents a large Type B to Type A ratio. For instance, R3 may be about 2:1. As such, the third phase may span between a 1:2 ratio to a 2:1 ratio. Team 102's TSA frequency multiplier may increase from a medium number to a high number through the third phase. This may allow for Team 102 players to rapidly increase in strength when there is a relatively small number of Type A players compared to Type B players.

Similarly, Team 104's TSA frequency may increase exponentially during the third phase. In instances where Team 104 includes fewer players than Team 102, Team 104's TSA frequency may increase at a slightly faster rate than Team 102 throughout the third phase. At R3, Team 104's TSA frequency may match Team 106's TSA frequency. In some embodiments which include a fourth phase from R3 to R4, Team 102's frequency may match Team 106's TSA frequency at R4.

During the third phase, Team 106's TSA frequency growth may stagnate. Team 106's TSA frequency growth may stagnate at a slightly higher than moderate number. This may limit the strength of Team 106 players when there is more Type B players than Type A players.

As shown, the XP growth of Type A may be the inversion of the XP growth of Type B. In some embodiments, the different XP growth curves may correlate to a game in which Type A players may be converted to Type B players, thus increasing the pool of Type B players.

In some embodiments, Team 104 players may be converted to Type B more rapidly than Team 102 players throughout the game. In such embodiments, Team 104's TSA frequency multiplier may adjust to the increase in disparity of team size between Team 102 and Team 104. As such, Team 104 may follow a more rapidly increasing pattern than shown in the graph. Similarly, Team 102 may follow a similar pattern when Team 102 players are converted more rapidly than Team 104 players throughout the game.

Figure 3B:
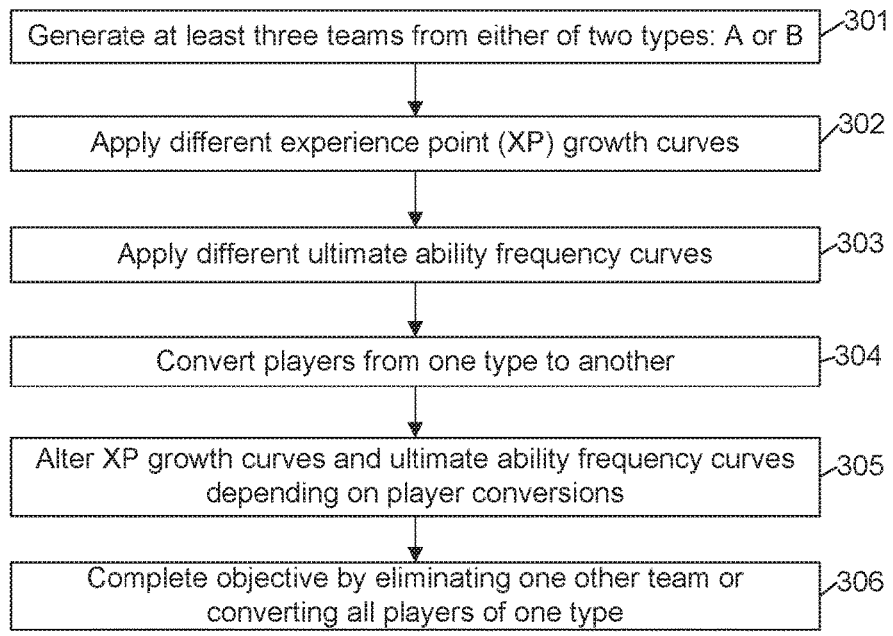
FIG. 3B depicts a flowchart showing a method of dynamically balancing teams in a multiple team based game in accordance with an implementation of the present application.

FIG. 3B depicts a flowchart showing a method of dynamically balancing teams in a multiple team based game in accordance with an implementation of the present application.

At a step 301, multiple teams may be generated for a game. In some embodiments, at least three teams are generated. Each of the three teams may be composed of players belonging to either Type A or Type B. The two different types may be of two different races, such as humans and mutants. The two different races may each have its own characteristics, features, and abilities. Each of the three teams may have a different team size. This can create an imbalance of teams. In general, the greater the team size, the stronger the team can be. In one example, one team can have 5 players, one team can have 2 players, and one team can have 3 players. In another example, two teams have 5 players, and one team has 2 players.

At a step 302, each team or type may have a different XP growth curve. The XP growth curve may be a type of growth pattern. XP growth may be tied to the rate of leveling up, which increases the strength of the player. In some embodiments, the XP growth curve is particular for each type, such as shown in FIG. 2A. In other embodiments, the XP growth curve is particular for each team. The XP growth curve can vary according to the ratio of Type B players to Type A players. For example, as shown in FIG. 2A, the XP growth curve may rise slowly for Type A when there is a significantly greater number of Type A players than Type B players, but may rise rapidly as the B:A ratio increases. Furthermore, Type B's XP growth curve may follow an inverse trend in which XP growth rises rapidly when there is a significantly greater number of Type A players than Type B players, and stagnates as the B:A ratio increases.

At a step 303, each team may have a team specific ability ("TSA") frequency curve. The TSA frequency curve may be another type of growth pattern. Similar to step 302, the TSA frequency curve may be particular to each type and/or each team. A team specific ability may be a special ability particular to each type. For example, a special suit may be the team specific ability for players of Type A. For another example, a special portion may be the team specific ability for players of Type B. The team specific ability may yield special benefits such as increased weapon damage or speed. This in turn may assist in the player activating the team specific ability to destroy enemies quicker or more easily. In some embodiments, the team specific ability may be retrieved from a team specific ability retrieval location. In some embodiments where team conversions are employed, the team specific ability may increase the ability for a player to convert another player of an opposing team.

The frequency of availability of the TSA may alter throughout the phases of a game. For example, the frequency of the TSA for each team may vary according to the number of Type B players to the number of Type A players ratio. The B:A ratio may correlate to certain phases of the game. As described in FIG. 3A above, the B:A ratio may be divided into at least three different phases. Teams that include Type A players may have a TSA frequency growth that rises slowly when there is a significantly greater number of Type A players than Type B players, but rises rapidly as the B:A ratio increases. In addition, teams that include Type B players may have a TSA frequency growth that follows an inverse trend in which TSA frequency growth rises rapidly when there is a significantly greater number of Type A players than Type B players, and stagnates as the B:A ratio increases.

At a step 304, players from one team may be converted into players of another team. For example, players of a team composed of Type B players, such as team 106 of FIG. 1A, may have an objective of converting Type A players into Type B players. Converting a Type A player into a Type B player may subtract the number of Type A players in the game and add to the number of Type B players in the game. In some embodiments, the Type A player converted into a Type B player never switches back to a Type A player during the game. In some embodiments, converting is known as "turning". In particular, Type B players may be mutants and Type A players may be humans, in which the mutants have an objective to turn humans into mutants.

The ability to converting players from one team to another may increase or decrease depending on different factors of the environment. For example, as shown in FIG. 1B, environment map 150 may feature different pathways 156 and 158. Pathways 158 may benefit Type B players by increasing their speed or strength. Pathways 158 may also penalize Type A players by decreasing their speed or strength, allowing Type B players to more easily convert the Type A players into Type B players.

At a step 305, XP growth curves and TSA frequency curves change as players are converted from one type to another. Conversions change the balance of team size. For example, as shown in FIG. 1A, team 102 may have 5 players, team 104 may have 3 players, and team 106 may have 2 players. Team 106, a Type B team, may convert Player 3 into a Type B player. This would also convert Player 3 into a team 106 player. Thus the team size of team 102 changes to 4 players, the team size of team 104 remains at 2 players, and the team size of team 106 changes to 3 players. Furthermore, the number of Type A players changes from 8 to 7, and the number of Type B players changes from 2 to 3. Team size changes due to conversions may alter the XP growth curve of each type and/or alter the TSA frequency curve of each type. This may also alter the XP growth curve of each team and/or alter the TSA frequency curve of each team.

At a step 306, each team tries to complete an objective. The objective may depend on the type of players in the team.

Some teams composed of Type B players, for example, have an objective to convert all Type A players into Type B players. For example, based on the teams of FIG. 1A, team 102 (composed of Type A) may have an objective to destroy the base of team 104 (composed of Type A), and team 104 may have an objective to destroy the base of team 102. Furthermore, team 106 (composed of Type B), may have an objective to destroy the base of either team 102 or team 104, and/or have an objective of converting all Type A players into Type B players. As soon as one objective is completed, the game may conclude.

Figure 4A:
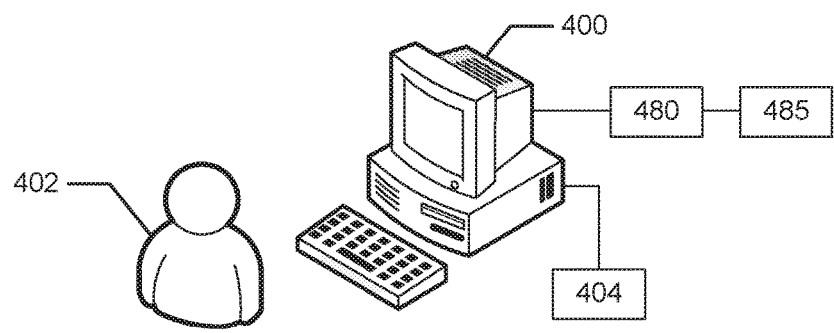
FIG. 4A illustrates a representation of a computer system and a user in accordance with an implementation of the present application.

FIG. 4A illustrates a representation of a computer system 400 and a user 402 in accordance with an implementation of the present application. The user 402 uses the computer system 400 to implement a gaming session for a multi-team self-balancing team game. The computer system 400 stores and executes a multi-team self-balancing application 490 of FIG. 4B. In addition, the computer system 400 may be in communication with a software program 404. Software program 404 may include the software code for a game. Software program 404 may be loaded on an external medium such as a CD, DVD, or a storage drive, as will be explained further below.

Furthermore, computer system 400 may be connected to a network 480. The network 480 can be connected in various different architectures, for example, a Client Server architecture, a Peer-to-Peer network architecture, or other type of architectures. For example, network 480 can be in communication with a server 485 that coordinates the multi-team self-balancing game. Also, the network can be different types of networks. For example, the network 480 can be the Internet, a Local Area Network or any variations of Local Area Network, a Wide Area Network, a Metropolitan Area Network, an Intranet or Extranet, or a wireless network. Also, the term "gaming session" can be used to identify any network topology where different users are connected to a network and to send and receive information from other users connected to the network.

Figure 4B:
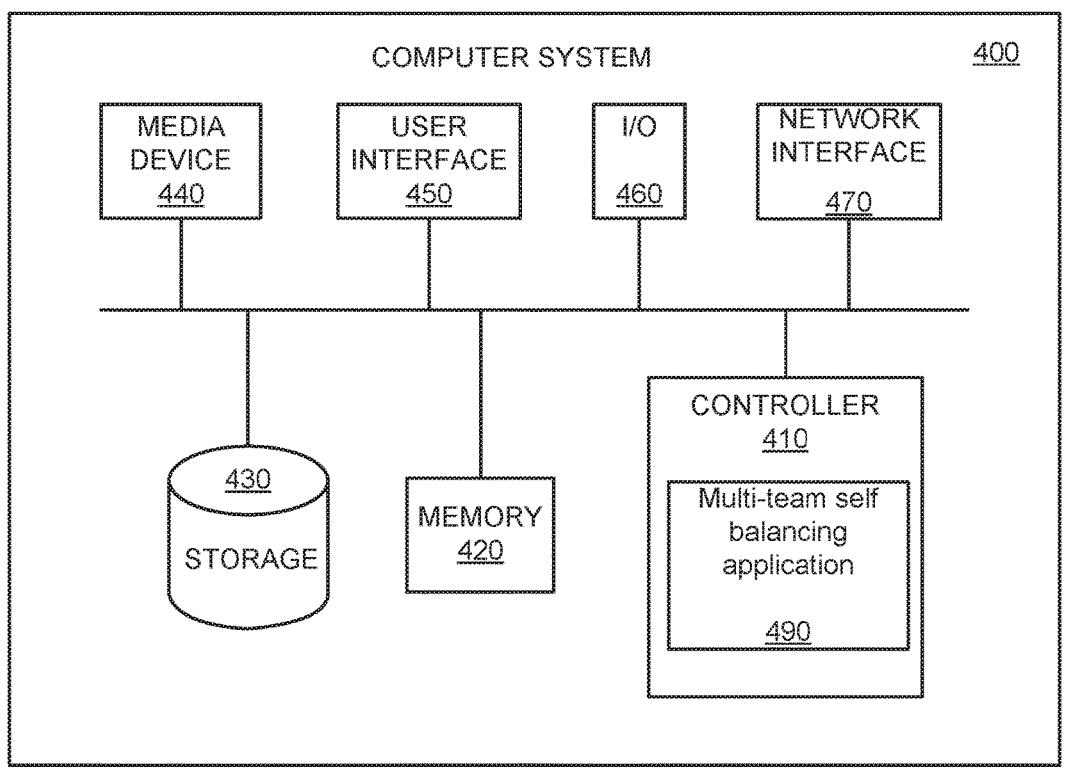
FIG. 4B is a functional block diagram illustrating the computer system hosting a controller in accordance with an implementation of the present application.

FIG. 4B is a functional block diagram illustrating the computer system 400 hosting the multi-team self-balancing application 490 in accordance with an implementation of the present application. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the multi-team self-balancing application 490 with a software system, such as to enable the creation and configuration of multi-team self-balancing games. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of computer system 400. For example, storage 430 stores data used by the multi-team self-balancing application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration). In one implementation, the computer system is a next generation game console from, for example, Sony Playstation®.

Figure 5:
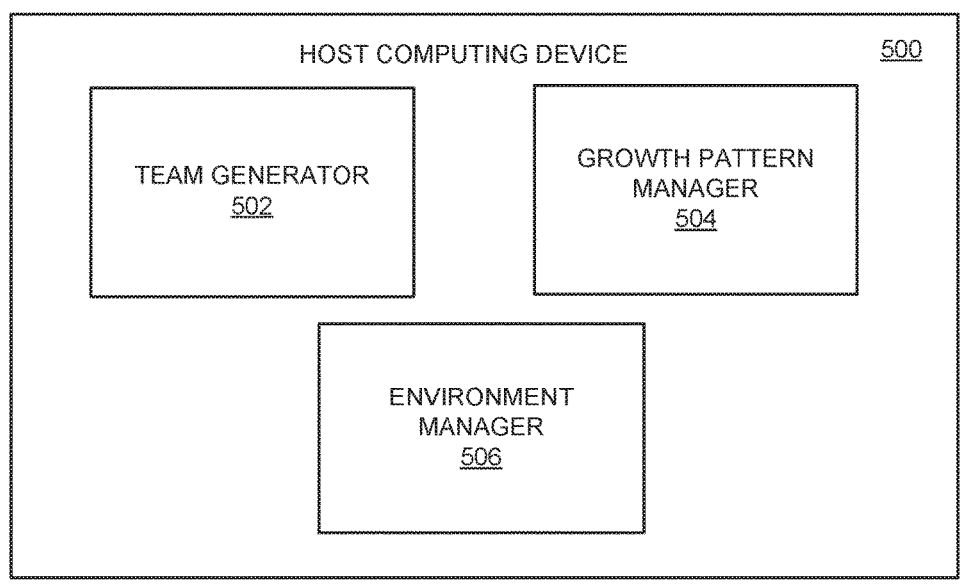
FIG. 5 is a functional block diagram illustrating a host computing device in accordance with an implementation of the present application.

FIG. 5 is a functional block diagram illustrating a host computing device 500 in accordance with an implementation of the present application. Host computing device 500 may embody one configuration of computer system 400 of FIG. 4B. Host computing device 500 may include a team generator 502, a growth pattern manager 504, and an environment manager 506.

Team generator 502 may generate at least three teams. The three teams may include a first team, a second team, and a third team. Each team may comprise members belonging to one of two types of A and B.

Growth pattern manager 504 may generate and manage the growth patterns of each team and/or of each type of member. Growth pattern manager 504 may apply a first growth pattern to members of type A and a second growth pattern to members of type B. The first and second growth pattern may each be a function of Type B to Type A ratio. In some embodiments, the first and second growth pattern may each be a function of time. Growth pattern manager 504 may apply a third growth pattern particular to the first team, a fourth growth pattern particular to the second team, and a fifth growth pattern particular to the third team. The third, fourth, and fifth growth patterns may each be a function of a type A quantity to type B quantity ratio. Growth pattern manager 504 may convert at least one member of type A to type B. Growth pattern manager 504 may adjust the third, fourth, and fifth growth patterns after the conversion of the at least one member of type A to type B.

Environment manager 506 may generate and manage an environment map of the game. Environment manager 506 may generate at least one environmental feature beneficial to converting the at least one member of type A to type B.

In some embodiments, balancing multi-team games according to the implementations of the invention produces many benefits. For example, balancing multiple teams in a game using the various steps discussed above can allow lower skill level players to level up quicker. This may allow for a fairer playing field for all players. For another example, balancing the multiple teams can create constant tension during a game in which no single team has a large distinct advantage over other teams. Advantages due to size or skill may diminish as the game balances out the teams. The self-balancing systems may create an engaging and chaotic game environment of multiple teams as each team tries to accomplish its objective.

The description herein of the disclosed implementations is provided to enable any person skilled in the art to make or use the present application. Numerous modifications to these implementations would be readily apparent to those skilled in the art, and the principals defined herein can be applied to other implementations without departing from the spirit or scope of the present application. For example, although the specification describes multi-team self-balancing games in the context of online games, these games can be used with any online or offline activity (offline in being based in an intranet, for example or local home network). In another example, the multi-team self-balancing games can be used over computers or mobile devices, in addition to game consoles. Thus, the present application is not intended to be limited to the implementations shown herein but is to be accorded the widest scope consistent with the principal and novel features disclosed herein.

Various implementations of the present application are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present application. In addition, the grouping of functions within a module or step is for ease of description. Specific functions can be moved from one module or step to another without departing from the present application.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A method for dynamically balancing imbalanced teams in a multiple team online gaming session, the method comprising:

generating, by at least one processor, at least three teams for participation in the online gaming session, the at least three teams including a first team, a second team, and a third team, each team comprising members belonging to a first type or a second type;

determining by the at least one processor, an imbalance between abilities of members belonging to the first type and the second type of the first team, the second team, and the third team;

applying a first growth pattern to members of the first type and a second growth pattern to members of the second type, wherein the first and second growth patterns are each a function of a ratio of a first number of members of the first type to a second number of members of the second type;

converting, by the at least one processor, at least one member of the first type to the second type based on the imbalance; and adjusting, by the at least one processor, the first and second growth patterns based on the conversion of the at least one member.

2. The method of claim 1, further comprising applying, by at least one processor, a third growth pattern particular to the first team, a fourth growth pattern particular to the second team, and a fifth growth pattern particular to the third team.

3. The method of claim 2, wherein the third, fourth, and fifth growth patterns are each a function of a ratio of a first number of members of the first type to a second number of members of the second type.

4. The method of claim 3, further comprising adjusting, by at least one processor, the third, fourth, and fifth growth patterns based on the conversion of the at least one member.

5. The method of claim 1, wherein the first and second growth patterns are each an experience point (XP) growth multiplier pattern.

6. The method of claim 1, wherein the first growth pattern increases incrementally during a first phase of the game, and the second growth pattern increases rapidly during the first phase of the game.

7. The method of claim 6, wherein the first growth pattern increases moderately during a second phase of the game, and the second growth pattern increases incrementally during the second phase of the game.

8. The method of claim 7, wherein the first growth pattern increases rapidly during a third phase of the game, and the second growth pattern stagnates during the third phase of the game.

9. The method of claim 1, wherein the first growth pattern is an inversion of the second growth pattern.

10. The method of claim 1, wherein the third, fourth, and fifth growth patterns are each a team specific ability frequency multiplier pattern.

11. The method of claim 1, wherein the first and second growth patterns adjust by shifting to a more rapidly increasing segment of the respective growth pattern after the conversion of the at least one member of the first type to the second type.

12. A non-transitory computer-readable storage medium storing a computer program to balance imbalanced teams in a multiple team online gaming session, the computer program comprising executable instructions that cause a computer to:

generate at least three teams for participation in the online gaming session, the at least three teams including a first team, a second team, and a third team, each team comprising members belonging to a first type or a second type;

determine an imbalance between abilities of members belonging to the first type and the second type of the first team, the second team, and the third team;

apply a first growth pattern to members of the first type and a second growth pattern to members of the second type, wherein the first and second growth patterns are each a function of a ratio of a first number of members of the first type to a second number of members of the second type;

convert at least one member of the first type to the second type; and adjust the first and second growth patterns based on the conversion of the at least one member.

13. The storage medium of claim 12, further comprising applying a third growth pattern particular to the first team, a fourth growth pattern particular to the second team, and a fifth growth pattern particular to the third team; and adjusting the third, fourth, and fifth growth patterns based on the conversion of the at least one member.

14. The storage medium of claim 13, wherein the third, fourth, and fifth growth patterns are each a function of a ratio of a first number of members of the first type to a second number of members of the second type.

15. The storage medium of claim 12, wherein the first growth pattern increases incrementally during a first phase of the game, and the second growth pattern increases rapidly during the first phase of the game.

16. The storage medium of claim 12, wherein the first growth pattern increases moderately during a second phase of the game, and the second growth pattern increases incrementally during the second phase of the game.

17. The storage medium of claim 16, wherein the first growth pattern increases rapidly during a third phase of the game, and the second growth pattern stagnates during the third phase of the game.

18. The storage medium of claim 12, wherein the first and second growth patterns adjust by shifting to a more rapidly increasing segment of the respective growth pattern after the conversion of the at least one member of the first type to the second type.

19. A host computing device for balancing imbalanced teams in a multiple team online gaming session, the host computing device comprising:

a team generator having one or more processors and configured to generate at least three teams for participation in the online gaming session, the at least three teams including a first team, a second team, and a third team, each team comprising members belonging to a first type or a second type; and a growth pattern manager having at least one processor and configured to apply a first growth pattern to members of the first type and a second growth pattern to members of the second type, wherein the first and second growth patterns are each a function of a ratio of a first number of members of the first type to a second number of members of the second type, convert at least one member of the first type to the second, and adjust the first and second growth patterns based on the conversion of the at least one member.

20. The host computing device of claim 19, further comprising an environment manager, the environment manager configured to generate at least one environmental feature beneficial to converting the at least one member.

* * * * *